United States Patent
Popa et al.

(10) Patent No.: US 10,144,846 B2
(45) Date of Patent: *Dec. 4, 2018

(54) CROSS-LINKABLE COATING COMPOSITION AND METHOD OF PRODUCING THE SAME

(71) Applicants: Dow Global Technologies LLC, Midland, MI (US); Rohm and Haas Company, Philadelphia, PA (US)

(72) Inventors: Paul J. Popa, Auburn, MI (US); Ben W. Schaefer, Bay City, MI (US); John N. Argyropoulos, Midland, MI (US); Kenneth E. Wohltmann, Collegeville, PA (US); Sandra Hofmann, Einsiedeln (CH); Daniel Haile, Westgrove, PA (US); Yanxiang Li, Midland, MI (US); Paul Foley, Traverse City, MI (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/899,659

(22) PCT Filed: Jun. 5, 2014

(86) PCT No.: PCT/US2014/041048
§ 371 (c)(1),
(2) Date: Dec. 18, 2015

(87) PCT Pub. No.: WO2014/204663
PCT Pub. Date: Dec. 24, 2014

(65) Prior Publication Data
US 2016/0130472 A1 May 12, 2016

Related U.S. Application Data

(63) Continuation-in-part of application No. 13/920,341, filed on Jun. 18, 2013, now Pat. No. 9,604,721.

(51) Int. Cl.
| | |
|---|---|
| C09D 175/14 | (2006.01) |
| C08K 3/22 | (2006.01) |
| C08K 3/34 | (2006.01) |
| C08K 3/36 | (2006.01) |
| C08G 12/46 | (2006.01) |
| C09D 133/10 | (2006.01) |
| C09D 161/20 | (2006.01) |
| F01D 5/28 | (2006.01) |

(52) U.S. Cl.
CPC ........... *C09D 175/14* (2013.01); *C08G 12/46* (2013.01); *C08K 3/22* (2013.01); *C08K 3/34* (2013.01); *C08K 3/36* (2013.01); *C09D 133/10* (2013.01); *C09D 161/20* (2013.01); *F01D 5/288* (2013.01); *C08K 2003/2241* (2013.01); *F05B 2280/6011* (2013.01); *F05D 2300/43* (2013.01); *Y02T 50/672* (2013.01)

(58) Field of Classification Search
CPC ... C08K 3/36; C08K 3/22; C08K 3/34; C08K 2003/2241; C08K 5/07; C09D 133/10; C09D 161/20; C09D 175/14
See application file for complete search history.

(56) References Cited

U.S. PATENT DOCUMENTS

| | | | |
|---|---|---|---|
| 6,177,514 B1 | 1/2001 | Pathak et al. | |
| 6,252,121 B1 | 6/2001 | Argyropolous et al. | |
| 6,541,594 B2 | 4/2003 | Ohrbom et al. | |
| 8,181,881 B2 | 5/2012 | Pedicano | |
| 2011/0159281 A1* | 6/2011 | Marx | B82Y 30/00 428/343 |
| 2011/0313091 A1 | 12/2011 | Argyropoulous et al. | |

FOREIGN PATENT DOCUMENTS

| | | |
|---|---|---|
| CN | 102464908 | 5/2012 |
| EP | 2 397 506 A1 * | 12/2001 |
| EP | 2397506 | 12/2011 |
| JP | 2009191284 | 8/2009 |
| JP | 2012026338 | 2/2012 |

OTHER PUBLICATIONS

Chinese Office Action dated Jul. 19, 2017, from Chinese counterpart Application No. 201480032911.0.
PCT Search Report dated Sep. 17, 2014; from PCT counterpart Application No. PCT/US2014/041048.
PCT IPRP dated Dec. 22, 2015; from PCT counterpart Application No. PCT/US2014/041048.
EP Office Action dated Jan. 27, 2016; from EP counterpart Application No. 147330526.
Chinese Office Action dated Mar. 8, 2017; from Chinese counterpart Application No. 201480032011.0.

(Continued)

*Primary Examiner* — Robert D. Harlan

(57) ABSTRACT

The instant invention provides cross-linkable coating compositions, process for producing the same, and substrates coated therewith. The cross-linkable coating composition comprises: (a) polyaldehyde, or acetal or hemiacetal thereof; (b) an acid catalyst having pKa of less than 6; (c) a liquid media; (d) an acrylic polycarbamate comprising at least an average of 2.0 carbamate functional groups, wherein said polycarbamate has a glass transition (Tg) of less than 25° C.; and (e) one or more fillers having a pH in the range of equal to or less than 9 and/or one or more pigments having a pH in the range of equal to or less than 9, and/or one or more additives having a pH in the range of equal to or less than 9, wherein said composition has a curing temperature in the range of less than 70° C.

15 Claims, No Drawings

(56) References Cited

OTHER PUBLICATIONS

EP Response to Office Action dated Jul. 22, 2016; from EP counterpart Application No. 14733052.6.
Chinese Office Action dated Jan. 24, 2018; from Chinese counterpart Application No. 201480032911.0.
Japanese Office Action dated Feb. 16, 2018; from counterpart Japanese Application No. 2016-521429.

\* cited by examiner

CROSS-LINKABLE COATING COMPOSITION AND METHOD OF PRODUCING THE SAME

FIELD OF INVENTION

The instant invention relates to cross-linkable coating compositions, process for producing the same, and substrates coated therewith.

BACKGROUND OF THE INVENTION

The use of polymeric materials, e.g. polyurethane based paints derived from isocyanates, in coating applications is generally known. However, polyurethane based paints derived from isocyanates have environmental and health concerns due to the use of isocyanates in the preparation of such coating compositions. Furthermore, commercially available isocyanate-free polyurethane paints do not cure under ambient temperatures, i.e. a temperature in the range of from 0° C. to 60° C. Additionally, wind turbine blade coating compositions are required to provide protection against collision with particulates such as rain drops. The wind blade industry also desires coating formulations with longer pot life and faster dry time to improve the coating process of the large wind blades.

Therefore, there is a need for a coating composition capable of being cured at ambient conditions while providing necessary flexibility and durability required for protecting wind turbine blades without the environmental and health concerns of conventional polyurethane coatings derived from isocyanates.

SUMMARY OF THE INVENTION

The instant invention provides cross-linkable coating compositions, process for producing the same, and substrates coated therewith.

In one embodiment, the instant invention provides a cross-linkable coating composition comprising: (a) polyaldehyde, or acetal or hemiacetal thereof; (b) an acid catalyst having pKa of less than 6; (c) a liquid media; (d) an acrylic polycarbamate comprising at least an average of 2.0 carbamate functional groups, wherein said polycarbamate has a glass transition (Tg) of less than 25° C.; and (e) one or more fillers having a pH in the range of equal to or less than 9 and/or one or more pigments having a pH in the range of equal to or less than 9, and/or one or more additives having a pH in the range of equal to or less than 9, wherein said composition has a curing temperature in the range of less than 70° C.

In an alternative embodiment, the instant invention further provides a process for producing a cross-linkable coating composition comprising the steps of: (a) selecting a polyaldehyde, or acetal or hemiacetal thereof; (b) selecting an acid catalyst having pKa of less than 6; (c) selecting a liquid media; (d) selecting a acrylic polycarbamate comprising at least an average of 2.0 carbamate functional groups wherein said polycarbamate has a glass transition (Tg) of less than 25° C.; (e) selecting one or more fillers having a pH in the range of equal to or less than 9, and/or one or more pigments having a pH in the range of equal to or less than 9, and/or one or more additives having a pH in the range of equal to or less than 9; (f) contacting said polyaldehyde, or acetal or hemiacetal thereof; said acid catalyst; said liquid media, said polycarbamate, said one or more filler, and optionally said one or more pigments; and (g) thereby forming a crosslinkable coating composition; wherein said composition has a curing temperature in the range of less than 70° C.

In another alternative embodiment, the instant invention further provides a coated substrate comprising a substrate; and one or more film layers derived from the inventive cross-linkable coating composition associated with at least one surface of said substrate.

In an alternative embodiment, the instant invention provides a cross-linkable coating composition, process for producing the same, coated articles made therefrom, in accordance with any of the preceding embodiments, except that the coated article is the rotor blade.

In an alternative embodiment, the instant invention provides a cross-linkable coating composition, process for producing the same, coated articles made therefrom, in accordance with any of the preceding embodiments, except that the rotor blade is a wind turbine blade, a helicopter blade, or an aircraft blade.

In an alternative embodiment, the instant invention provides a cross-linkable coating composition, process for producing the same, coated articles made therefrom, in accordance with any of the preceding embodiments, except that the substrate comprises one or more metals, one or more plastics, one or more composite materials, and one or more films derived from one or more primers.

In an alternative embodiment, the instant invention provides a cross-linkable coating composition, process for producing the same, coated articles made therefrom, in accordance with any of the preceding embodiments, except that the polycarbamate has a glass transition (Tg) of less than 0° C.

In an alternative embodiment, the instant invention provides a cross-linkable coating composition, process for producing the same, coated articles made therefrom, in accordance with any of the preceding embodiments, except that the one or more film layers have a thickness in the range of from 5 to 500 μm.

In an alternative embodiment, the instant invention provides a cross-linkable coating composition, process for producing the same, coated articles made therefrom, in accordance with any of the preceding embodiments, except that the one or more films have an MEK resistance in the range of from greater than 50 double rubs.

In an alternative embodiment, the instant invention provides a cross-linkable coating composition, process for producing the same, coated articles made therefrom, in accordance with any of the preceding embodiments, except that the one or more films have rain erosion resistance of greater than 30 minutes.

In an alternative embodiment, the instant invention provides a cross-linkable coating composition, process for producing the same, coated articles made therefrom, in accordance with any of the preceding embodiments, except that the polyaldehyde, acetal or hemiacetal thereof has from 2 to 20 carbon atoms or from more than 20 carbon atoms, with the proviso that a polyaldehyde having more than 20 carbon atoms has at least one aldehyde group for every 10 carbon atoms.

In an alternative embodiment, the instant invention provides a cross-linkable coating composition, process for producing the same, coated articles made therefrom, in accordance with any of the preceding embodiments, except that the polyaldehyde, acetal or hemiacetal thereof is selected from the group consisting of (cis,trans)-1,4-cyclohexanedicarboxyaldehydes, (cis,trans)-1,3-cyclohexanedicarboxyaldehydes, and mixtures thereof.

In an alternative embodiment, the instant invention provides a cross-linkable coating composition, process for producing the same, coated articles made therefrom, in accordance with any of the preceding embodiments, except that the acrylic polycarbamate component has carbamate groups and hydroxyl groups in a ratio of the equivalents of carbamate groups to the number of equivalents of hydroxyl functional groups of from 1:1 to 20:1.

In an alternative embodiment, the instant invention provides a cross-linkable coating composition, process for producing the same, coated articles made therefrom, in accordance with any of the preceding embodiments, except that the cross-linkable coating composition further comprises one or more curing inhibitors.

In an alternative embodiment, the instant invention provides a cross-linkable coating composition, process for producing the same, coated articles made therefrom, in accordance with any of the preceding embodiments, except that the curing inhibitor is chosen from water, an alcohol or a mixture thereof.

DETAILED DESCRIPTION OF THE INVENTION

The instant invention provides cross-linkable coating composition, process for producing the same, and substrates coated therewith.

The cross-linkable coating composition according to the present invention comprises: (a) polyaldehyde, or acetal or hemiacetal thereof; (b) an acid catalyst having pKa of less than 6; (c) a liquid media; (d) an acrylic polycarbamate comprising at least an average of 2.0 carbamate functional groups, wherein said polycarbamate has a glass transition (Tg) of less than 25° C.; and (e) one or more fillers having a pH in the range of equal to or less than 9 and/or one or more pigments having a pH in the range of equal to or less than 9, and/or one or more additives having a pH in the range of equal to or less than 9, wherein said composition has a curing temperature in the range of less than 70° C.

Polyaldehyde Component, or Acetal or Hemiacetal Thereof

The cross-linkable coating composition comprises a polyaldehyde component, or acetal or hemiacetal thereof. In one embodiment, the polyaldehyde component comprises from 2 to 20 carbon atoms. In another alternative embodiment, the polyaldehyde comprises greater than 20 carbon atoms, with the proviso that a polyaldehyde having more than 20 carbon atoms has at least one aldehyde group for every 10 carbon atoms.

The crosslinkable composition may comprise from 2 to 50 percent by weight of the polyaldehyde component or acetal or hemiacetal thereof; for example, from 5 to 25 percent by weight of the polyaldehyde component or acetal or hemiacetal thereof. In one embodiment, the polyaldehyde is selected from the group consisting of (cis,trans)-1,4-cyclohexanedicarboxyaldehydes, (cis,trans)-1,3-cyclohexanedicarboxyaldehydes, pentane-1,5-dial, ethane-1,2-dial, and mixtures thereof.

For example, the polyaldehyde component can have two or more aldehyde groups. Suitable polyaldehydes of the present invention can have two, three, four or more aldehyde groups.

The polyaldehyde component can be a cyclic, straight or branched; cyclic and non-aromatic; or cyclic and aromatic.

The polyaldehyde component can comprise one or more cyclic, non-aromatic polyaldehydes or one or more aromatic polyaldehydes. For example, the polyaldehyde component can comprise one or more cyclic, non-aromatic polyaldehydes having from 3 to 20 ring carbon atoms, and may consist essentially of one or more cyclic, non-aromatic polyaldehydes having from 3 to 20 ring carbon atoms.

Each cyclic, non-aromatic polyaldehyde component can independently have from 5 to 12 ring carbon atoms, and, can be a mixture of (cis,trans)-1,4-cyclohexanedicarboxyaldehydes and (cis,trans)-1,3-cyclohexanedicarboxyaldehydes.

Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; endo,endo-2,6-norbornanedicarboxaldehyde product (endo and exo mixture); 3-(3-formylcyclohexyl)propanal; 3-(4-formylcyclohexyl)propanal; 2-(3-formylcyclohexyl)propanal; 2-(4-formylcyclohexyl)propanal; and cyclododecane-1,4,8-tricarbaldehyde and a mixture containing one or more of 2,8-, 3,8-, and 4,8-di(formyl)tricyclo[5.2.1.0$^{2,6}$]decane.

The trans-1,3-cyclohexanedicarboxaldehyde; cis-1,3-cyclohexanedicarboxaldehyde; trans-1,4-cyclohexanedicarboxaldehyde; and cis-1,4-cyclohexanedicarboxaldehyde can be prepared by a process comprising hydroformylating 3-cyclohexene-1-carboxaldehyde using the hydroformylating conditions described herein.

The 1:1 mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde.

The exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; and endo,endo-2,6-norbornanedicarboxaldehyde product (endo and exo mixture) can be prepared by a process comprising reacting acrolein and cyclopentadiene in a Diels-Alder reaction to give a 2-norbornene-5-carboxaldehyde, and hydroformylating the 2-norbornene-5-carboxaldehyde.

The 3-(3-formylcyclohexyl)propanal; 3-(4-formylcyclohexyl)propanal; 2-(3-formylcyclohexyl)propanal; and 2-(4-formylcyclohexyl)propanal can be prepared by a process comprising hydroformylating vinyl cyclohexene.

The cyclododecane-1,4,8-tricarbaldehyde can be prepared by a process comprising trimerizing 1,3-butadiene to give 1,4,8-cyclododecatriene, and hydroformylating the 1,4,8-cyclododecatriene.

The mixture of 2,8- , 3,8-, and 4,8-di(formyl)tricyclo [5.2.1.0$^{2,6}$]decane can be prepared by a process comprising hydroformylating dicyclopentadiene.

The polyaldehyde component can be unblocked and unprotected or blocked or protected. Blocked or protected polyaldehydes can be formed by reacting an unblocked and unprotected polyaldehyde with a suitable blocking or protecting group. Examples of protecting or blocking groups for aldehyde groups are bisulfites (e.g., from reaction of the polyaldehyde with sodium bisulfite), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Preferred aldehyde protecting groups are, and preferred protected polyaldehydes comprise, a hydrated group (>C(OH)$_2$), hemiacetal, acetal, or imine. These preferred protected polyaldehydes can be prepared by respectively reacting the polyaldehyde with water; one mole equivalent of an alkanol (e.g., methanol or ethanol); two mole equivalents of the alkanol; or ammonia or a primary amine (e.g., methylamine). The hemiacetal, acetal, or imine protecting group can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514 B1.

Preferably, the polyaldehyde is stable in neat form (i.e., does not materially self-polymerize) and, more preferably, is substantially water insoluble and is stable in neat form.

The polyaldehydes of the present invention can be prepared by any suitable means, including oxidation of corresponding polyols, and via batchwise and continuous processes for preparing the polyaldehydes. Preferably the polyaldehyde is prepared by hydroformylating a substantially water-insoluble mono-olefin containing aldehyde compound, substantially water-insoluble multi-olefin containing aldehyde compound, or a substantially water-insoluble multi-olefin containing starting compound (collectively referred to herein for convenience as substantially water-insoluble olefin-containing compounds). The hydroformylation step can be performed by any conventional means such as with hydrogen gas, carbon monoxide, and the olefin-containing starting compound. Preferably the hydroformylating step is performed in a manner as generally described in U.S. Pat. No. 6,252,121 B1, which describes an improved separation process.

Preparations of the polyaldehyde can optionally further comprise reversibly blocking or protecting aldehyde groups of the polyaldehydes with aldehyde blocking or protecting groups to give a blocked or protected polyaldehyde, respectively. The protected polyaldehyde can be employed in place of or in addition to the polyaldehyde component.

Preferably, the polyaldehyde component can be a mixture comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked forms of these polyaldehydes.

Acid Catalyst Component

The cross-linking coating composition comprises 0.1 to 5 percent by weight of one or more acid catalysts; for example, from 0.5 to 3 weight percent, or from 0.5 to 2 weight percent, based on the total weight of the crosslinkable coating composition.

The acid catalyst component may be any acid catalyst suitable for promoting the reaction between the acrylic carbamate functional component and the polyaldehyde component. In one embodiment, the acid catalyst may be a Lewis acid. In another embodiment, the acid catalyst may be a protic acid. In one embodiment, the acid catalyst has a pKa of less than 6.0, or in the alternative, a pKa of less than 4.0.

The curing step of the present invention is initiated by an acid catalyst. Such initiation can be performed by exposure to heat for a period of time sufficient to produce the inventive crosslinked composition. The heat can be applied radiantly although other means such as by convection or combinations of means can be used.

Any compound, substance or material suitable for increasing a rate of reaction of a carbamate group with an aldehyde group (—C(=O)H) can be employed as the acid catalyst. Examples of acid catalysts are Lewis acids (e.g., boron trifluoride etherate) and protic acids (i.e., Brønsted acids). The acid catalyst can comprise a protic acid characterizable as having a pK$_a$ of 6 or less, wherein pK$_a$ is negative base-10 logarithm of acid dissociation constant, K$_a$, of the protic acid.

A preferred protic acid is an inorganic protic acid or organic protic acid. A preferred inorganic protic acid is phosphoric acid or sulfuric acid. A preferred organic protic acid is carboxylic acid, phosphonic acid, or sulfonic acid. A preferred carboxylic acid is acetic acid, trifluoroacetic acid, propionic acid, or a dicarboxylic acid. A preferred phosphonic acid is methylphosphonic acid. A preferred sulfonic acid is methanesulfonic acid, benzenesulfonic acid, a camphorsulfonic acid; para-toluenesulfonic acid, or dodecylbenzenesulfonic acid. Examples of suitable Lewis acid curing catalysts are AlCl$_3$; benzyltriethylammonium chloride (TEBAC); Cu(O$_3$SCF$_3$)$_2$; (CH$_3$)$_2$BrS$^+$Br$^-$; FeCl$_3$ (e.g., FeCl$_3$.6H$_2$O); HBF$_4$; BF$_3$.O(CH$_2$CH$_3$)$_2$; TiCl$_4$; SnCl$_4$; CrCl$_2$; NiCl$_2$; and Pd(OC(O)CH$_3$)$_2$.

The acid catalyst can be unsupported (no solid support) or supported, i.e. covalently bonded to a solid support. Examples of supported acid catalysts are supported curing catalysts such as supported acid catalysts such as acid (H$^+$) forms of cation exchange-type polymer resins (e.g., ethanesulfonic acid, 2-[1-[difluoro[(1,2,2-trifluoroethenyl)oxy]methyl]-1,2,2,2-tetrafluoroe thoxy]-1,1,2,2-tetrafluoro-, polymer with 1,1,2,2-tetrafluoroethene, available under the trade name NAFION NR 50 (E. I. du Pont de Nemours & Co., Inc., Wilmington, Del.) and ethenylbenzenesulfonic acid polymer with diethenylbenzene available under the trade name AMBERLYST™ 15 (Rohm and Haas Co., subsidiary of The Dow Chemical Company, Midland, Mich., USA).

Liquid Media Component

The cross-linkable coating composition can comprise from 0 to 90 percent by weight of one or more solvents; for example, from 20 to 70, or from 30 to 50, percent by weight of one or more solvents. Solvents may be needed for reducing the viscosity of the cross-linkable coating composition to facilitate application to a substrate. Solvents may also be required to maintain all the components of the cross-linkable coating composition in one single phase. Such solvents include, but are not limited to, organic solvents. Exemplary solvents include, but are not limited to, ethanol, ethylene glycol monoalkyl ethers, diethylene glycol monoalkyl ethers, propylene glycol monoalkyl ethers and dipropylene glycol monoalkyl ethers.

Alternative examples of suitable organic solvents are non-polar or polar organic solvents such as, for example, an alkane (e.g., a (C$_6$-C$_{12}$)alkane), aromatic hydrocarbons (e.g. toluene, xylene) ether (e.g., (C$_2$-C$_{12}$)ether, e.g., a (C$_2$-C$_{12}$) dialkyl ether), carboxylic ester (e.g., a (C$_2$-C$_{12}$)carboxylic ester), ketone (e.g., a (C$_3$-C$_{12}$)ketone), secondary or tertiary carboxamide (e.g., a secondary or tertiary (C$_3$-C$_{12}$)carboxamide), sulfoxide (e.g., a (C$_2$-C$_{12}$)sulfoxide), or a mixture of two or more thereof.

In one embodiment, water can be used as a solvent or additive, provided that the amount of water does not result in a two-phase composition.

Acrylic Polycarbamate Component

The acrylic polycarbamate component comprises at least an average of 2.0 carbamate functional groups, and has a glass transition of less than 25° C., for example from −50 to less than 5° C. Unless otherwise noted herein, the term "carbamate functional group" means a radical structure of formula

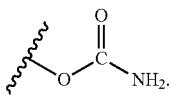

In one embodiment, the acrylic polycarbamate is prepared by reacting the hydroxyl groups of an acrylic polyol with an unsubstituted carbamic acid alkyl ester (such as methyl carbamate) or urea in the presence of a catalyst at elevated temperatures using a transesterification procedure that is known by one skilled in the art. In one embodiment, at least 40% of the hydroxyl groups in the acrylic polyol are converted to carbamate groups, or in the alternative, at least 60%, or in another alternative, at least 80%. The acrylic polyols are well known in the art and can be prepared from polymerizing a hydroxyl-functional (meth)acrylate such as 2-hydroxyethyl (meth)acrylate with other (meth)acrylic monomers, such as methyl methacrylate, acrylic acid, butyl acrylate, and the like. The polymerization can be performed using a variety of processes (such as solution polymerization) that are known by one skilled in the art.

In another embodiment, the acrylic polycarbamate can also be prepared by polymerizing a carbamoylalkyl (meth)acrylate with other (meth)acrylic monomers, such as methyl methacrylate, acrylic acid, butyl acrylate, and the like as well as other co-monomers such as styrene, acrylonitrile and the like.

Such acrylic polycarbamates can have a molecular weight in the range of from 1000 to 100,000, or in the alternative, in the range of from 1500 to 10,000. As used herein, molecular weight refers to the number average molecular weight, which may be determined by gel permeation chromatography (GPC) using a polystyrene standard. The glass transition temperature of the acrylic polycarbamate preferably is less than 25° C., for example from −50 to less than 5° C. The glass transition temperature ($T_g$) of the acrylic polycarbamate may be determined by a variety of methods such as differential scanning calorimetry (DSC). In one embodiment, the carbamate functionality of the acrylic polycarbamate can be at least 2, or in the alternative, at least 3, or in the alternative, at least 4.

In one embodiment, the acrylic polycarbamate component can be produced via batch process or continuous process. In one embodiment, one or more acrylic polycarbamates, which are optionally dissolved in a solvent, e.g. organic solvent, or in the alternative, melted via heat.

In one embodiment, the acrylic polycarbamate has carbamate groups and hydroxyl groups in a ratio of the equivalents of carbamate groups to the number of equivalents of hydroxyl functional groups of from 1:1 to 20:1.

Other Components

In one embodiment, the cross-linkable coating composition can comprise one or more curing inhibitor agents. Exemplary curing inhibitor agents include, but are not limited, to alcohols and/or water and/or mixtures thereof. Exemplary curing inhibitor agents include, but are not limited to primary alcohols such as ethanol, n-propanol, and n-butanol.

The cross-linkable coating composition may comprise from 0 to 50 percent by weight of the one or more curing inhibitor agents; for example, from 2 to 30, or from 10 to 20, percent by weight of the curing inhibitor agents.

In one embodiment, the cross-linkable coating composition can comprise one or more pigments having a pH in the range of equal to or less than 9. Exemplary pigments include, but are not limited to, $TiO_2$, lamp black, and talc.

In one embodiment, the cross-linkable coating composition can comprise one or more fillers having a pH in the range of equal to or less than 9. Exemplary fillers include, but are not limited to, clay, barium sulfate, and silica.

In one embodiment, the cross-linkable coating composition can comprise one or more additives having a pH in the range of equal to or less than 9. Exemplary additives include, but are not limited to, ultraviolet (UV) light stabilizers, dispersing agents, flow & leveling agents and rheology agents. Such additional additives will, of course, depend on the intended use of the coating composition. Typically useful conventional formulation additives include UV light stabilizers (hindered amines) such as Bis-(1-octyloxy-2,2,6,6-tetramethyl-4-piperidinyl) sebacate (Tinuvin 123 supplied by BASF) and 2,4-bis[N-Butyl-N-(1-cyclohexyloxy-2,2,6,6-tetramethylpiperidin-4-yl)amino]-6-(2-hydroxyethylamine)-1,3,5-triazine (Tinuvin 152 supplied by BASF); pigment and filler dispersing additives such as polyphosphoric acid polyesters (Disperbyk 110 supplied by BYK USA, Inc); and flow and leveling agents such as polyether modified polydimethylsiloxanes (BYK 333 supplied by BYK USA, Inc); and rheology modifiers such as organowaxes (Troythix XYZ supplied by Troy Corporation).

Process for Producing the Cross-Linkable Coating Composition

The process for producing a cross-linkable coating composition according to the present invention comprises the steps of: (a) selecting a polyaldehyde, or acetal or hemiacetal thereof; (b) selecting an acid catalyst having pKa of less than 6; (c) selecting a liquid media; (d) selecting a acrylic polycarbamate comprising at least an average of 2.0 carbamate functional groups wherein said polycarbamate has a glass transition (Tg) of less than 25° C.; (e) selecting one or more fillers having a pH in the range of equal to or less than 9, and/or one or more pigments having a pH in the range of equal to or less than 9, and/or one or more additives having a pH in the range of equal to or less than 9; (f) contacting said polyaldehyde, or acetal or hemiacetal thereof; said acid catalyst; said liquid media, said polycarbamate, said one or more filler, and optionally said one or more pigments; and (g) thereby forming a crosslinkable coating composition; wherein said composition has a curing temperature in the range of less than 70° C.

The inventive crosslinkable composition can be made in batch process via any conventional mixing device under ambient temperature and pressure.

The cross-linked coating compositions of the present invention, even those produced by curing at room temperature, have a high degree of crosslinking.

Coated Substrates

The coated substrates of the present invention comprise a coating layer derived from the inventive cross-linkable coating composition, which is in contact to at least a portion of a substrate capable of being coated.

The inventive coated substrates can be prepared by any suitable method. For example, in a method of coating a surface of a substrate, the method comprises applying the inventive cross-linkable coating composition to at least a portion of a surface of a substrate and curing at a curing temperature of 70° C. or less, or, for example, 30° C. or less, so as to prepare a coated substrate comprising a crosslinked composition.

The inventive crosslinkable coating composition can be applied to the surface of the substrate(s) by any suitable applying means such as, for example, brushing, calendaring, rolling, spraying, mopping, troweling, or dipping. The substrate being coated can be of any shape including, for example, a flat or rolled sheet (e.g., cylinder), sphere, beads, finely divided particles, and the like. The surface of the substrate being coated can be irregular or regular, continuous or discontinuous, porous or non-porous, jointed or not jointed.

The substrates suitable for being coated independently can comprise any material. Examples of suitable material are wood, metal, ceramic, plastic, composite materials, and/or glass.

The coated article comprises a coated substrate comprising a layer of the inventive cross-linked coating composition in contact with at least a portion of a substrate.

The inventive coating exhibits pendulum hardness (7 day) in the range greater than 20, for example 20 to 200.

The coatings of the present invention exhibit resistance to organic solvent, i.e., methyl ethyl ketone (MEK) back-and-forth double rubbing (i.e., one rub back, one rub forth equals one double rub) of 50 or greater, or in the alternative, 70 or greater, or in the alternative 100 or greater, or in the alternative from 50 to 200.

The inventive coating exhibits a cross-hatch adhesion value of from 1B to 5B, for example, from 2B to 5B, or in the alternative from 3B to 5B, or in the alternative from 4B to 5B, or in another alternative 5B.

In determining any one or more of the aforementioned pendulum hardness, cross-hatch adhesion value, and number of MEK double rubs (back-and-forth), the coating is formed on a steel substrate as described herein. The inventive coating had a thickness, as measured as described later, of from 10 micrometers (μm) to 250 μm, more preferably 50 μm or more.

The curing of the cross-linkable coating composition can be completed within 7 days or less, for example, within 5 days or less, or within 24 hours or less, or within 12 hours or less.

EXAMPLES

The following examples illustrate the present invention but are not intended to limit the scope of the invention. The examples of the instant invention demonstrate capability of being cured at ambient conditions while providing necessary flexibility and durability required for protecting wind turbine blades without the environmental and health concerns of conventional polyurethane coatings derived from isocyanates Formulation Components Ti-Pure® R-900—titanium dioxide supplied by DuPont (pigment)
Ti-Pure® TS6200—titanium dioxide supplied by DuPont (pigment)
Optiwhite®—calcined aluminum silicate supplied by Burgess Pigment (filler)
Acematt® TS100—silica supplied by Evonik Industries (filler)
Cimbar™UF—barium sulfate supplied by Cimbar Performance Minerals (filler)
n-Butyl acetate supplied by Dow Chemical (organic solvent)
Aromatic 150 supplied by ExxonMobil (organic solvent)
Ethanol supplied by Fisher Scientific (organic solvent)
Cycat® 4040—40% solution of p-toluenesulfonic acid in isopropanol supplied by Cytec (acid catalyst)
Acrylic Polyol Components
HEMA—hydroxyethyl methacrylate (Rocryl 400 (HEMA-LA)) supplied by The Dow Chemical Company
n-BA—n-Butyl acrylate supplied by the The Dow Chemical Company
2-EHA—2-ethylhexyl acrylate supplied by The Dow Chemical Company
MMA—methyl methacrylate supplied by The Dow Chemical Company
IBoMA—Isobornyl methyacrylate supplied by Sartomer
Glacial Acrylic Acid—supplied by The Dow Chemical Company
t-BPAc—t-butyl peroxyacetate (Luperox 7M50) supplied by Arkema
Xylenes—supplied by Fisher Scientific
Amyl Acetate—supplied by Fisher Scientific
Iso-butanol—supplied by Fisher Scientific
Acrylic Polyol A is an acrylic polyol with a solution OH EW of 592, solids content of 86.4% in amyl acetate, xylene, and iso-butanol, and has a $T_g$ of $-21.9°$ C. and greater than 2 hydroxyl functional group. Acrylic Polyol A is prepared according to the following process and based on the formulation components reported in Table $1_i$.

Process for Preparing Acrylic Polyol A

A 5 L, 3-neck round bottom flask equipped with an adapter allowing 2 feed lines to enter the reactor. The middle neck of the flask is equipped with a nitrogen line inlet and a Teflon stir bearing and mixing shaft. The third neck has a Claison adapter with a thermocouple and a Freidrich's condenser.

The monomers are charged to a glass jar and placed on a balance. The initiator and solvent are charged to a jar and placed on a balance. The monomer and initiator are added to the flask using 2 FMI pumps. The flow rate for the monomer blend is 3.35 g/min. The initiator blend flow rate is 0.74 g/min.

Initial charge of 117 g of solvent blend is added to the flask and heated to 140° C. using a heating mantle, with gentle stirring and low nitrogen flow. When the flask reaches 140° C., the monomer and initiator pumps are started. The flow rate is monitored by weight loss. When the monomer and initiator jars are empty, ~5 g of solvent blend is added to the jar and added to the flask through the pumps to rinse the transfer lines. Then the chaser initiator (3.34 g in 15.4 g solvent blend) is pumped through the initiator pump at the same flow rate and then flushed with ~5 g of the solvent blend.

Solvent Blend: 55% amyl acetate/42% xylenes/3% iso-butanol

Initiator: 50% t-BPAc in mineral spirits

Acrylic polyol B is an acrylic polyol with a solution OH EW of 521, solids content of 76.4% in xylene and iso-butanol, and has a $T_g$ of $-24.9°$ C. and greater than 2 hydroxyl functional group.

Acrylic Polyol B is prepared according to the following process and based on the formulation components reported in Table $1_i$.

Process for Preparing Acrylic Polyol B

A 5 L, 3-neck round bottom flask equipped with an adapter allowing 2 feed lines to enter the reactor. The middle neck of the flask is equipped with a nitrogen line inlet and a Teflon stir bearing and mixing shaft. The third neck has a Claison adapter with a thermocouple and a Freidrich's condenser.

The monomers are charged to a glass jar and placed on a balance. The initiator and solvent are charged to a jar and placed on a balance. The monomer and initiator are added to the flask using 2 FMI pumps. The flow rate for the monomer blend is ~10 g/min. The initiator blend flow rate is ~2.2 g/min.

Initial charge of 350 g of solvent blend is added to the flask and heated to 140° C. using a heating mantle, with gentle stirring and low nitrogen flow. When the flask reaches 140° C., the monomer and initiator pumps are started. The flow rate is monitored by weight loss. When the monomer and initiator jars are empty, ~15 g of solvent blend is added to the jar and added to the flask through the pumps to rinse the transfer lines. Then the chaser initiator is pumped through the initiator pump at the same flow rate and then flushed with ~15 g of the solvent blend.

Solvent Blend: 93% xylenes/7% iso-butanol
Initiator: 50% tBPAc in mineral spirits
Acrylic Polyol C is an acrylic polyol with a solution OH equivalent weight (EW) of 572, solid content of 74.3% in xylene, and has a $T_g$ −14° C. Acrylic Polyol C is prepared according to the following process and based on the formulation components reported in Table $1_i$.

Process for Preparing Acrylic Polyol C

A 5 L, 2 piece round bottom reactor equipped with 5 port head is used. The middle neck of the head is equipped with a Teflon stir bearing and mixing shaft. One side neck has an adapter allowing 2 feed lines to enter the reactor, another neck has a thermocouple, another neck has a nitrogen inlet and the last neck is equipped with a Freidrich's condenser.

The monomers are charged to a glass jar and placed on a balance (3000 g batch). The initiator and solvent are charged to a jar and placed on a balance. The monomer and initiator are added to the reactor using 2 FMI pumps. The flow rate for the monomer blend is 19.0 g/min. The initiator blend flow rate is 2.76 g/min which is calculated to feed the initiator for 15 minutes longer than the monomers to act as a chaser.

Initial charge of 345 g of solvent added to the flask and heated to 140° C. using a heating mantle, with gentle stirring and low nitrogen flow. When the flask reaches 140° C. the nitrogen flow is stopped and 5% of the monomer mix is added as a heel, once back at reflux 5% of the initiator blend is added and the monomer and initiator pumps are started. The flow rate is monitored by weight loss. The contents are held at temperature for 15 additional minutes after the initiator feed is depleted. At this time 194 g of solvent is added and allowed to mix for 15 additional minutes before being poured out.

Solvent: Xylenes
Initiator: 50% t-BPAc in mineral spirits
Acrylic Polyol D is an acrylic polyol with a solution OH EW of 579.6, solids content of 76.2% in xylene, and has a $T_g$ 12.5° C. Acrylic Polyol D is prepared according to the following process and based on the formulation components reported in Table $1_i$.

Process for Preparing Acrylic Polyol D

A 5 L, 2 piece round bottom reactor equipped with 5 port head is used. The middle neck of the head is equipped with a Teflon stir bearing and mixing shaft. One side neck has an adapter allowing 2 feed lines to enter the reactor, another neck has a thermocouple, another neck has a nitrogen inlet and the last neck is equipped with a Freidrich's condenser.

The monomers are charged to a glass jar and placed on a balance (3000 g batch). The initiator and solvent are charged to a jar and placed on a balance. The monomer and initiator are added to the reactor using 2 FMI pumps. The flow rate for the monomer blend is 20.0 g/min. The initiator blend flow rate is 2.91 g/min which is calculated to feed the initiator for 15 minutes longer than the monomers to act as a chaser.

Initial charge of 345 g of solvent added to the flask and heated to 140° C. using a heating mantle, with gentle stirring and low nitrogen flow. When the flask reaches 140° C. the nitrogen flow is stopped and the monomer and initiator pumps are started. The flow rate is monitored by weight loss. The contents are held at temperature for 15 additional minutes after the initiator feed is depleted. At this time 194 g of solvent is added and allowed to mix for 15 additional minutes before being poured out.

Solvent: Xylenes
Initiator: 50% t-BPAc in mineral spirits
Acrylic Polyol E is an acrylic polyol with a solution OH EW of 611.8, solids content of 77.3% in xylene, and has a $T_g$ −24.3° C. Acrylic Polyol E is prepared according to the following process and based on the formulation components reported in Table $1_i$.

Process for Preparing Acrylic Polyol E

A 5 L, 3-neck round bottom flask equipped with an adapter allowing 2 feed lines to enter the reactor. The middle neck of the flask is equipped with a nitrogen line inlet and a Teflon stir bearing and mixing shaft. The third neck has a Claison adapter with a thermocouple and a Freidrich's condenser.

The monomers are charged to a glass jar and placed on a balance (3000 g batch). The initiator and solvent are charged to a jar and placed on a balance. The monomer and initiator are added to the reactor using 2 FMI pumps. The flow rate for the monomer blend is 20.0 g/min. The initiator blend flow rate is 2.91 g/min which is calculated to feed the initiator for 15 minutes longer than the monomers to act as a chaser.

Initial charge of 345 g of solvent added to the flask and heated to 140° C. using a heating mantle, with gentle stirring and low nitrogen flow. When the flask reaches 140° C. the nitrogen flow is stopped and the monomer and initiator pumps are started. The flow rate is monitored by weight loss. The contents are held at temperature for 15 additional minutes after the initiator feed is depleted. At this time 194 g of solvent is added and allowed to mix for 15 additional minutes before being poured out.

Solvent: Xylenes
Initiator: 50% t-BPAc in mineral spirits

TABLE $1_i$

| Polyol | HEMA Weight % | BA Weight % | 2-EHA Weight % | MMA Weight % | IBoMA Weight % | AA Weight % | t-BPAc % |
|--------|---------------|-------------|----------------|--------------|----------------|-------------|----------|
| A | 30 | 70 | — | — | — | — | 4 |
| B | 30 | — | 56 | 14 | — | — | 4 |
| C | 30 | — | 49 | 20 | — | 1 | 4 |
| D | 30 | — | 40 | 14.5 | 14.5 | 1 | 4 |
| E | 30 | — | 69 | — | — | 1 | 4 |

Acrylic Carbamate Polymers

Comparative Polycarbamate 1 is prepared using acrylic polyol Paraloid AU-608X, which is commercially available from The Dow Chemical Company. Paraloid AU-608X has a solution OH equivalent weight (EW) of 1120, solids content of 58% in xylene, and has a $T_g$ 46° C. Comparative 1 has greater than 2 functional group. Additional properties are measured and listed in Table 1.

Acrylic Polyol (Paraloid AU-608X) was charged to a 500 ml 3-neck round bottom flask equipped with a mechanical stirrer, Dean-Stark trap, condenser, and nitrogen bubbler system. 54.05 g of methyl carbamate was added along with 1.06 g of dibutyltin oxide (carbamoylation catalyst) to the 3-neck reaction flask. The flask was purged with nitrogen and heated to 140° C. As the temperature was increased, methanol was collected in the Dean-Stark trap and the volume recorded. The reaction was allowed to continue until the methyl carbamate was consumed as determined by C13 NMR—disappearance of the methyl resonance from the methyl carbamate (52.2 ppm) using Mercury Vx 400 MHz NMR from Agilent Technologies. Characterization of the polycarbamate included percent solids (weight loss), OH number (titration), and DSC for $T_g$. Additional properties are measured and listed in Table 1. The approximate carbamate conversion was 86%.

Inventive Polycarbamate A is prepared using an acrylic polyol (Acrylic Polyol A) with a solution OH EW of 592, solids content of 86.4% in amyl acetate, xylene, and iso-butanol, and has a $T_g$ of −21.9° C. and greater than 2 carbamate functional group.

Acrylic Polyol A was charged to a 500 ml 3-neck round bottom flask equipped with a mechanical stirrer, Dean-Stark trap, condenser, and nitrogen bubbler system. 54.05 g of methyl carbamate was added along with 1.06 g of dibutyltin oxide (carbamylation catalyst) to the 3-neck reaction flask. The flask was purged with nitrogen and heated to 140° C. As the temperature was increase, methanol was collected in the Dean-Stark trap and the volume recorded. The reaction was allowed to continue until the methyl carbamate was consumed as determined by C13 NMR—disappearance of the methyl resonance from the methyl carbamate (52.2 ppm) using Mercury Vx 400 MHz NMR from Agilent Technologies. The approximate carbamate conversion was 74%. Characterization of the polycarbamate included percent solids (weight loss), OH number (titration), and DSC for $T_g$. Additional properties are measured and listed in Table 1.

Inventive Polycarbamate B is prepared using an acrylic polyol (Acrylic Polyol B) with a solution OH EW of 521, solids content of 76.4% in xylene and iso-butanol, and has a $T_g$ of −24.9° C. and greater than 2 carbamate functional group.

Acrylic Polyol B was charged to a 500 ml 3-neck round bottom flask equipped with a mechanical stirrer, Dean-Stark trap, condenser, and nitrogen bubbler system. 54.05 g of methyl carbamate was added along with 1.06 g of dibutyltin oxide (carbamylation catalyst) to the 3-neck reaction flask. The flask was purged with nitrogen and heated to 140° C. As the temperature was increased, methanol was collected in the Dean-Stark trap and the volume recorded. The reaction was allowed to continue until the methyl carbamate was consumed as determined by C13 NMR—disappearance of the methyl resonance from the methyl carbamate (52.2 ppm) using Mercury Vx 400 MHz NMR from Agilent Technologies. Characterization of the polycarbamate included percent solids (weight loss), OH number (titration), and DSC for $T_g$. Additional properties are measured and listed in Table 1. The approximate carbamate conversion was 96%.

Inventive Polycarbamate C is prepared using acrylic polyol (Acrylic Polyol C) with a solution OH equivalent weight (EW) of 572, solid content of 74.3% in xylene, and has a $T_g$ −14° C. Additional properties are measured and listed in Table 1. The approximate carbamate conversion was 84%.

Inventive Polycarbamate D is prepared using an acrylic polyol (Acrylic Polyol D) with a solution OH EW of 579.6, solids content of 76.2% in xylene, and has a $T_g$ 12.5° C. Additional properties are measured and listed in Table 1. The approximate carbamate conversion was 79%.

Inventive Polycarbamate E is prepared using an acrylic polyol (Acrylic Polyol E) with a solution OH EW of 611.8, solids content of 77.3% in xylene, and has a $T_g$ −24.3° C. Additional properties are measured and listed in Table 1. The approximate carbamate conversion was 67%.

CHDA 1—1,3/1,4-Cyclohexanedicarboxaldehyde, 88% solids with a EW of 78.8 (polyaldehyde) CHDA 2—1,3/1,4-Cyclohexanedicarboxaldehyde, 82.72% solids with a EW of 84.6 (polyaldehyde).

TABLE 1

|  | CEW[1] (Solid) | CEW (Solution) | Solids (Wt. %) | $T_g$ (° C.) | Mn (daltons) | Carbamate Functionality[2] |
|---|---|---|---|---|---|---|
| Polycarbamate 1 | 800 | 1294 | 61.8 | 36.3 | 3572 | 4.5 |
| Polycarbamate A | 730 | 1278 | 57.1 | −17.7 | 6042 | 8.3 |
| Polycarbamate B | 458 | 581 | 78.8 | −13.9 | 4325 | 9.4 |
| Polycarbamate C | 552 | 728 | 75.8 | 4.0 | 5000 | 9.0 |
| Polycarbamate D | 602 | 828 | 72.7 | 22.6 | 3400 | 5.6 |
| Polycarbamate E | 748 | 987 | 75.8 | −6.0 | 4600 | 6.1 |

[1]CEW = Carbamate Equivalent Weight
[2]Carbamate Functionality = Mn/CEW

The carbamate equivalent weight (CEW) on solids is calculated using the following equation:

$$CEW = [OH\ EW_{polyol} + (43 \times Carbamate\ Conversion)]$$
Carbamate Conversion, where the carbamate conversion is approximated using the following equation:

$$Carbamate\ Conversion = (OH\ \#_{polyol} - OH\ \#_{polycarbamate}) \div OH\#_{polyol}$$

Inventive Coating Examples 1-3 (IE-1-3) and Comparative Coating Example A (CE-A)

The Inventive Coating Examples 1-3 (IE-1-3) and Comparative Coating Example A (CE-A) containing pigments and fillers were prepared in a FlackTek SpeedMixer™ (Model DAC 600 FV-K, FlackTek, Inc.) dual asymmetric centrifuge. The formulations were prepared based on the following process based on the formulation components listed in Table 2.

1. The polycarbamate polymer, Ti-Pure R900 and Optiwhite or Cimbar UF were added to a max 300 SpeedMixer cup. The polymer and fillers were mixed by hand with a spatula to pre-wet the fillers.
2. The formulation was mixed for approximately 1 min at 2300 rpm and visually checked and then the contents on the side of the cup were mixed in by hand with a spatula.
3. Step 2 was repeated.
4. Approximately half of the silica was added to the cup and mixed by hand with a spatula to pre-wet the silica.
5. The formulation was mixed for approximately 1 min at 2300 rpm and visually checked and then the contents on the side of the cup were mixed in by hand with a spatula.
6. Step 5 was repeated.
7. The remaining silica was added to the cup and mixed by hand with a spatula to pre-wet the silica.

8. The formulation was mixed for approximately 1 min at 2300 rpm and visually checked and then the contents on the side of the cup were mixed in by hand with a spatula.
9. Step 8 was repeated.
10. The Aromatic 150 was added to the cup and mixed by hand with a spatula.
11. The formulation was mixed for approximately 1 min at 2300 rpm and visually checked and then the contents on the side of the cup were mixed in by hand with a spatula.
12. The n-butyl acetate was added to the cup and mixed by hand with a spatula.
13. The formulation was mixed for approximately 1 min at 2300 rpm and visually checked and then the contents on the side of the cup were mixed in by hand with a spatula.
14. The ethanol and Cycat 4040 were added to the cup and mixed by hand with a spatula.
15. The formulation was mixed for approximately 1 min at 2300 rpm and visually checked and then the contents on the side of the cup were mixed in by hand with a spatula.
16. Just prior to coating application the CHDA (polyaldehyde crosslinker) was added to the cup and mixed for approximately 1 min.

Coating Substrate

The composite airfoil substrates are shown in FIG. 1. The coatings applied to the substrate had an average thickness of 0.010 to 0.015 inches, and a maximum thickness limited to 0.040 inches. Each specimen had a maximum weight of 200 g.

Inventive Coated Substrates 1-2 (ICS-1 and ICS-2) and Comparative Coated Substrate A (CCS-A)

The primer, as described below and Table 2, was spray applied to composite airfoil substrates to a nominal dry film thickness of ~100 μm and allowed to cure for 24 hours at ambient conditions. The primed composite airfoil substrates were then sanded with 120 grit sandpaper prior to applying the top coat. The top coat formulations were allowed to cure for at least 7 days at 50% relative humidity and 22° C. The properties of ICS-1, ICS-2, and CCS-A were tested for their properties, and the results are reported in Table 3.

Inventive Coated Substrate 3 (ICS-3)

The composite airfoil substrate was sanded prior to coating. The top coat formulations were spray applied to unprimed composite airfoil substrates.

The top coat formulations were allowed to cure for at least 7 days at 50% relative humidity and 22° C. The properties of ICS-3 were tested for their properties, and the results are reported in Table 3.

Formulation Components for the Primer

DER 3680X90 is an epoxy resin solution supplied by The Dow Chemical Company.
GNS SG-8008 is an epoxy reactive diluent supplied by GNS Technologies, LLC, a subsidiary of The Dow Chemical Company.
BYK 104S is a pigment dispersing agent (solution of a lower molecular weight unsaturated polycarboxylic acid polymer and a polysiloxane copolymer) supplied by BYK Additives & Instruments.
BYK 501 is a defoaming agent (solution of foam destroying polymers, silicone free) supplied by BYK Additives & Instruments.
Wollastocoat 10ES is a filler (wollastonite aka calcium orthosilicate) supplied by NYCO.
Halox SZP-391 is a corrosion inhibitor (Strontium Zinc Phosphosilicate) supplied by Halox.
Blanc Fixe is a filler (precipitated barium sulfate) supplied by Sachtleben.
Red Iron Oxide is a pigment supplied by Lanxess.
Bentone SD-2 is a rheology modifier additive (an organic derivative of a bentonite clay) supplied by Elementis.
Xylenes is a solvent supplied by Fisher Scientific.
Dowanol PMA is a solvent supplied by The Dow Chemical Company.
Methyl isobutyl Ketone (MIBK) is a solvent supplied by Fisher Scientific.
Ancamine K-54 is a epoxy hardener (2,4,6-Tri(dimethylaminomethyl) phenol) supplied by Air Products.
GNS GS-140 is an epoxy hardener (polyamide) supplied by GNS Technologies, LLC, a subsidiary of The Dow Chemical Company.

Primer Formulation and Preparation

Epoxy/Polyamide Primer Part A & Part B were prepared based on the formulation components and according to the process described in Table 2.

TABLE 2

| Material Name PART A | Wt Percent (Based on the total weight of Part A) |
|---|---|
| Grind-Combine and mix with high speed disperser to a 5-6 Hegman | |
| DER 3680X90 | 17.77 |
| GNS SG-8008 | 2.64 |
| Xylene | 8.88 |
| BYK 104S | 0.38 |
| BYK 501 | 0.38 |
| Wollastocoat 10 ES | 25.98 |
| Halox SZP-391 | 7.63 |
| Blanc Fixe | 14.44 |
| Red Iron Oxide | 8.08 |
| Bentone SD-2 | 1.35 |
| Grind Sub-total | 87.53 |
| LetDown-Add DER 3680X90 to grind above while mixing, then add Dowanol PMA, MIBK, and Xylene-mix until homogenous | |
| DER 3680X90 | 8.55 |
| Dowanol PMA | 1.30 |
| MIBK | 1.59 |
| Xylene | 1.03 |
| Total | 100 |

| Material Name PART B | Wt Percent (based on total weight of B Part) |
|---|---|
| Premix-Combine GS-140, Ancamine and xylene in a paint can and mix until homogenous | |
| GNS GS-140 | 72.2 |
| Ancamine K-54 Dan | 9.4 |
| Xylene | 18.4 |
| Total | 100.0 |

Prior to coating application, the Part A and Part B of the epoxy/polyamide primer formulation were combined at a ratio of 7.2:1 by weight and mixed until homogenous.

TABLE 3

| | Solids (wt %) | Eq Wt (Solution) | CE-A Weight (g) | IE-1 Weight (g) | IE-2 Weight (g) | IE-3 Weight (g) |
|---|---|---|---|---|---|---|
| Polycarbamate 1 | 61.8 | 1294 | 148.4 | — | — | — |
| Polycarbamate A | 57.1 | 1278 | — | 272 | — | 162.8 |
| Polycarbamate B | 78.8 | 581 | — | — | 137 | |

TABLE 3-continued

|  | Solids (wt %) | Eq Wt (Solution) | CE-A Weight (g) | IE-1 Weight (g) | IE-2 Weight (g) | IE-3 Weight (g) |
|---|---|---|---|---|---|---|
| Barytes UF | 100 | — | 47.2 | 48.2 | — | 28.86 |
| Optiwhite | 100 | — | — | — | 14.7 | — |
| Ti-Pure R900 | 100 | — | 21.41 | 65.83 | 13.25 | 38.18 |
| Acematt TS 100 | 100 | — | 10.23 | 17.55 | 6.6 | 10.51 |
| Aromatic 150 | 0 | — | 32.2 | 34.1 | 39 | 17.8 |
| n-butyl acetate | 0 | — | 14 | 29.7 | 17 | 16.3 |
| Ethanol | 0 | — | 13.6 | 22.2 | 16.9 | 13.3 |
| Cycat 4040 | 40 | — | 2 | 3.4 | 1.87 | 2.04 |
| CHDA 1 | 88 | 78.8 | — | 16.8 | — | 10 |
| CHDA 2 | 82.72 | 84.6 | 9.7 | — | 19.9 | — |

TABLE 4

| Example | Time (min) | | | |
|---|---|---|---|---|
|  | 15 | 30 | 45 | 60 |
| CCS-A | 5% erosion | 40-45% erosion | | |
| ICS-1 | No Damage | No Damage | No Damage | No Damage |
| ICS-2 | No Damage | No Damage | No Damage | No Damage |
| ICS-3 | No Damage | No Damage | No Damage | |

Example CCS-A illustrates that a high $T_g$ polymer does not yield a coating that can pass the rain erosion test.

Examples ICS-1 & ICS-2 illustrate that low $T_g$ polymers are required to pass the rain erosion test. These examples also illustrate that different levels of pigment/fillers and types can be used in the top coat formulation and pass the rain erosion test.

Example ICS-3 illustrates that a primer is not necessary for the top coat to have excellent adhesion and pass the rain erosion test.

Inventive Coating Examples 4-6 (IE-4-6)

The Inventive Coating Examples 4-6 (IE-4-6), i.e. coating formulations containing pigments, were prepared in a Flack-Tek SpeedMixer™ (Model DAC 150, FlackTek, Inc.) dual asymmetric centrifuge. The substrates and coating formulations were prepared based on the following process and according to the formulation components listed in Table 5.

Substrate Preparation

Using commercially available paper towel, iron phosphate treated steel substrates (from Q-panel company, Type R-412-I, size: 4×12×0.032 inch) were cleaned with isopropanol thoroughly and then air-dried for approximately between 5 to 10 minutes.

Coating Formulation Preparation

The polycarbamate component and pigment were charged into a speed mixer cup, and mixed approximately 60-120 seconds at 3000 rpm or until mixed well. Solvent (n-butyl acetate) was added and mixed another 60 seconds at 3000 rpm. The sides scraped and were mixed 60 seconds at 3000 rpm again. Ethanol & acid catalyst (Cycat4040) were added, and mixed for 60 seconds at 3000 rpm. The sides of the cup were scraped, and CHDA 2 was added and mixed for 30 seconds at 3000 rpm.

Inventive Coated Substrates 4-6 (ICS-4-6)

The coating formulations were applied to substrates using the 10 mils coating applicator (#24 8-path coating applicator from P.G.&T.CO.) to achieve 2-3 mils coating dry film thickness. The coating formulations were cured in the humidity control room (50% RH, ~24° C.) for 7 days before testing; thereby forming ICS-4, ICS-5, and ICS-6. The properties of ICS-4, ICS-5, and ICS-6 were tested, and the results are reported in Table 6.

TABLE 5

|  | Solids (w%) | Eq Wt (Solution) | IE-4 Weight (g) | IE-5 Weight (g) | IE-6 Weight (g) |
|---|---|---|---|---|---|
| Polycarbamate C | 75.8 | 728 | 52.24 | — | — |
| Polycarbamate D | 72.7 | 828 | — | 54.88 | — |
| Polycarbamate E | 75.8 | 987 | — | — | 53.43 |
| TS-6200 | 100 | — | 14.85 | 14.96 | 15.19 |
| n-butyl acetate | 0 | — | 16.31 | 14.07 | 16.28 |
| Ethanol | 0 | — | 9.2 | 9.2 | 9.2 |
| Cycat 4040 | 40 | — | 1.34 | 1.34 | 1.33 |
| CHDA 2 | 82.72 | 84.6 | 6.07 | 5.61 | 4.58 |

TABLE 6

|  | ICS-4 | ICS-5 | ICS-6 |
|---|---|---|---|
| 60° Gloss | 85 | >80 | >80 |
| Pendulum Hardness [sec] | | | |
| 24 hr | 40 | >70 | 40 |
| 7 day | 75 | >120 | 60 |
| Cross-Hatch Adhesion | 4B-5B | 2-3B | 4B-5B |
| MEK Resistance [double rubs] | | | |
| 25% Film Loss | >100 | >100 | >100 |
| Water Resistance (24 hr) covered | 4 | 4 | 4-5 |
| Impact Resistance-Direct (in-lbs) | 30 | 20 | >100 |
| Mandrel Bend (0.5") | Pass | Fail | Pass |

ICS-4, ICS-5, and ICS-6 results illustrate that all of these inventive coatings have good MEK resistance which indicates that the coatings can be cured at ambient temperature. Also, the coating performance depends on the $T_g$ of polycarbamate materials. High $T_g$ polycarbamate provided harder but less flexible coating, while the lower $T_g$ polycarbamate materials gave relatively softer but very flexible coatings. Therefore, these polycarbamates can be used alone in the coating formulation, or by blending two or more than two polycarbamates with different $T_g$ to balance the coating properties to meet the application requirements.

Test Methods

Test methods include the following:
OH Number Titration

Where OH # is the magnitude of the hydroxyl number for a polyol as expressed in terms of milligrams potassium hydroxide per gram or polyol (mg KOH/g polyol). Hydroxyl number (OH #) indicates the concentration of hydroxyl moieties in a composition of polymers, particularly polyols. The hydroxyl number for a sample of polymers is determined by acetylation with pyridine and acetic anhydride in which the result is obtained as a difference between two titrations with potassium hydroxide solution, one titration with a blank for reference and one titration with the sample. A hydroxyl number is the weight of potassium hydroxide in milligrams that will neutralize the acetic anhydride capable of combining by acetylation with one gram of a polyol. A higher hydroxyl number indicates a higher concentration of hydroxyl moieties within a composition. A description of how to determine a hydroxyl number for a composition is well-known in the art, for example in Woods, G., The ICI Polyurethanes Book, $2^{nd}$ ed. (ICI Polyurethanes, Netherlands, 1990). Hydroxyl equivalent weight (OH EW) is calculated using the following formula

OH EW=56100/OH#

Percent Solids (Polycarbamate or Polyol)

Approximately 0.5 g of polymer is weighed into an aluminum weighing dish. Approximately 1 ml of toluene is added to the aluminum weighing dish. Duplicate weighing dishes are prepared and placed in a 105° C. oven for greater than 4 hours. The percent solids are calculated using the following formula:

% Solids=100X (final sample weight/initial sample weight)

The percent solids are an average of the duplicate samples.

$T_g$ Determination

The $T_g$ (glass transition temperature) is measured using a DSC1000 from TA Instruments. Between 7-14 mg of dried polymer (sample taken from percent solids test) was weighed into a DSC pan. The pan was heated from room temperature to 150° C. at 10° C./min; then cooled to −100° C. at 10° C./min and heated again to 150° C. at 10° C./min.

Rain Erosion

Rain erosion testing is a test for evaluating the erosion resistance of coatings on wind turbine blades. It simulates the effect from collisions with rain, dust, etc by spraying water over the coated surface of fast moving test specimens. A suitable apparatus for measuring the rain erosion of the coating is the Air Force Research Laboratory Materials & Manufacturing Rain Erosion Test Apparatus, described hereinbelow.

The composite leading edge airfoil specimen configuration is shown in FIG. 1 and described above. Configuration 2 was used for examples CCS-A and ICS-1, 2 and 3 and the test was performed at 240 miles per hour (MPH) for up to 60 min.

Referring to FIG. 2, the rotating arm apparatus consists of an eight foot diameter, double arm blade designed to produce high tip velocities with zero lift and low drag coefficient. Duplicate test specimens are mounted at the leading edge tip sections of the double rotating arm. The specimens can be rotated at variable velocities between 100 and 650 MPH. The double arm blade is mounted horizontally on a vertical drive shaft (see FIG. 2). The simulated rainfall is produced by four curbed manifold quadrants. Each manifold has 24 equally-spaced capillaries. De-ionized water is delivered to the four manifold quadrants simultaneously from a water storage tank. Temperature controlled water then fills the capillaries to produce raindrops. Drop size and drop rate are controlled by the water temperature, capillary orifice diameter, and head pressure of the water storage tank. Raindrops from the simulation apparatus impact the test specimens throughout their entire annular path. Drop size and drop rate are approximately 1.8 to 2.0 mm and 6 to 7 drops per second, respectively. Calibration of the water supply system is scheduled on a regular basis. All functions of the apparatus are controlled and monitored from the remote control room. Instantaneous velocity readout is monitored by an integrating digital voltmeter. Variable speed operation is possible through the operator's manual control. Magnetic pickups and high intensity strobe lights provide stop motion viewing of the test specimens under actual test conditions. Closed-circuit television cameras and monitors allow the operator to visually observe the test specimens undergoing rain field exposure. Tests can also be videotaped for later study.

Observations were made via video during the testing noting when erosion occurred through the topcoat to the primer or substrate (color change). A time >30 min is considered acceptable; more preferred is a time >45 min; and most preferred is a time of 60 min without any pitting to the primer or substrate. The acceptance criteria used was no visible damage to the topcoat after the various testing times.

Gloss

Gloss is measured using a BYK micro-TRI-gloss instrument. Gloss is a measure of light reflectance of a coating at defined angles. Gloss is measured at 60°.

Pendulum Hardness

Pendulum hardness testing is performed according to ASTM D4366 method, and average of 3 measurements are averaged and reported.

Cross-hatch Adhesion

Cross-hatch adhesion was measured and rated according to ASTM D-3359. Specific ASTM ratings for the adhesion test are shown in Table below. Adhesion ratings of 4B and 5B are desired.

ASTM D-3359 Classification for Adhesion

| Rating | Percent of Coating Removed |
| --- | --- |
| 5B | 0% (Perfect adhesion) |
| 4B | <5% |
| 3B | 5-15% |
| 2B | 15-35% |
| 1B | 35-65% |
| 0B | >65% |

MEK Double Rubs

Solvent resistance and degree of crosslinking is evaluated by using a semi-automated MEK rub test machine (DJH Designs Inc.). The coated substrates were rubbed with a cloth soaked in methyl ethyl ketone (MEK) that is attached to the rubbing block. Each back and forth rub counts as one double rub. This machine applies constant downward pressure (80 psi), constant speed (70 double rubs/min) and counts the number of double strokes applied.

Water Resistance

Water resistance was tested by exposing the coatings to DI water, with methodology similar to ASTM D1308. A big DI water droplet was placed on the coating surface and covered with a watch glass for 24 hrs. After 24 hrs, the water was wiped off the coating. The coating was visually inspected for any signs of color change, staining, blistering, etc. The coating was rated as a 5 (no effect) through 1 (severe blistering or completely dissolved).

Impact Resistance

The impact resistance of the coating was determined by using a Gardner impact tester according to ASTM D2794.

Mandrel Bend test

The mandrel bend test is to evaluate the coating's resistance to cracking (flexibility). The coated panels are bent over a mandrel and the resistance to cracking of the coating is determined. The results are recorded if the coating pass or fail the mandrel with 0.5' diameter.

The present invention may be embodied in other forms without departing from the spirit and the essential attributes thereof, and, accordingly, reference should be made to the appended claims, rather than to the foregoing specification, as indicating the scope of the invention.

We claim:

1. A crosslinkable coating composition comprising:
   (a) a polyaldehyde, or acetal or hemiacetal thereof;
   (b) an acid catalyst having pKa of less than 6;
   (c) a liquid media;
   (d) an acrylic polycarbamate comprising at least an average of 2.0 carbamate functional groups, wherein said polycarbamate has a glass transition (Tg) of less than 0° C.; and
   (e) one or more fillers having a pH in the range of equal to or less than 9 and/or one or more pigments having a pH in the range of equal to or less than 9, and/or one or more additives having a pH in the range of equal to or less than 9,
   wherein said composition has a curing temperature in the range of less than 70° C.

2. A process for producing a crosslinkable coating composition comprising the steps of:
   (a) selecting a polyaldehyde, or acetal or hemiacetal thereof;
   (b) selecting an acid catalyst having pKa of less than 6;
   (c) selecting a liquid media;
   (d) selecting a acrylic polycarbamate comprising at least an average of 2.0 carbamate functional groups, wherein said polycarbamate has a glass transition (Tg) of less than 0° C.;
   (e) selecting one or more fillers having a pH in the range of equal to or less than 9, and/or one or more pigments having a pH in the range of equal to or less than 9, and/or one or more additives having a pH in the range of equal to or less than 9;
   (f) contacting said polyaldehyde, or acetal or hemiacetal thereof; said acid catalyst; said liquid media, said polycarbamate, said one or more filler, and optionally said one or more pigments; and
   (g) thereby forming a crosslinkable coating composition;
   wherein said composition has a curing temperature in the range of less than 70° C.

3. A coated substrate comprising:
   a substrate; and
   one or more film layers derived from the crosslinkable coating composition of claim 1 associated with at least one surface of said substrate.

4. A rotor blade comprising:
   a blade having at least one surface;
   one or more film layers derived from the crosslinkable coating composition of claim 1 associated with at least one said surface of said blade.

5. The rotor blade of claim 4, wherein said rotor blade is a wind turbine blade, a helicopter blade, or an aircraft blade.

6. The coated substrate of claim 1, wherein said substrate comprises one or more metals, one or more plastics, one or more composite materials, and one or more films derived from one or more primers.

7. The coated substrate according to claim 3, wherein said one or more film layers have a thickness in the range of from 5 to 500 μm.

8. The coated article of claim 3, wherein said one or more films have an MEK resistance in the range of from greater than 50 double rubs.

9. The rotor blade of claim 4, wherein said one or more films have rain erosion resistance of greater than 30 minutes.

10. The crosslinkable composition of claim 1, wherein said polyaldehyde, acetal or hemiacetal thereof has from 2 to 20 carbon atoms or from more than 20 carbon atoms, with the proviso that a polyaldehyde having more than 20 carbon atoms has at least one aldehyde group for every 10 carbon atoms.

11. The crosslinkable composition of claim 1, wherein said polyaldehyde, acetal or hemiacetal thereof is selected from the group consisting of (cis,trans)-1,4-cyclohexanedicarboxyaldehydes, (cis,trans)-1,3-cyclohexanedicarboxyaldehydes, and mixtures thereof.

12. The crosslinkable composition of claim 1, wherein the acrylic polycarbamate component has carbamate groups and hydroxyl groups in a ratio of the equivalents of carbamate groups to the number of equivalents of hydroxyl functional groups of from 1:1 to 20:1.

13. The crosslinkable composition of claim 1, where said crosslinkable composition further comprises one or more curing inhibitors.

14. The crosslinkable composition of claim 13, wherein the curing inhibitor is chosen from water, an alcohol or a mixture thereof.

15. The crosslinkable composition of claim 13, wherein the curing inhibitor is chosen from water, an alcohol or a mixture thereof.

* * * * *